Figure 1:
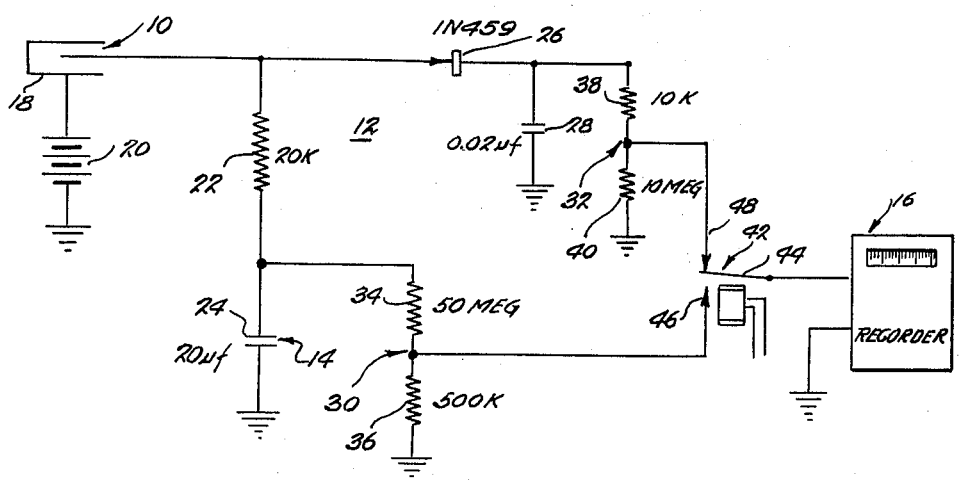

Nov. 17, 1964    H. A. THOMAS    3,157,789
RADIATION DETECTION SYSTEM COMPRISING A PULSE INTEGRATOR
Filed Nov. 21, 1960

Inventor
HAROLD A. THOMAS.
By Soans, Anderson, Luedeka & Fitch
Attys

United States Patent Office 3,157,789
Patented Nov. 17, 1964

3,157,789
RADIATION DETECTION SYSTEM COMPRISING
A PULSE INTEGRATOR
Harold A. Thomas, San Diego, Calif., assignor to General
Dynamics Corporation, New York, N.Y., a corporation
of Delaware
Filed Nov. 21, 1960, Ser. No. 70,796
6 Claims. (Cl. 250—83.6)

The present invention relates to radiation measuring devices and particularly to a device for measuring both the peak intensity and total energy of a pulse of radiant energy.

Generally, a radiation measuring device includes a detector for converting radiant energy into an electrical current, and an indicating circuit, which may include a recorder, for measuring a function of the current. The indicating circuit may be designed so that the recorder records the instantaneous current through the detector, which current is proportional to the amount of radiant energy incident on the detector per unit time (i.e., the intensity of the radiant energy). In other radiation measuring devices, the recorder is arranged to record the total current through the detector for a given time interval thereby recording the total radiant energy received by the detector (i.e., the integral of the radiant energy). In certain applications, it is desirable to measure both the peak intensity and the total energy of a pulse of radiant energy.

An object of the present invention is the provision of a device for measuring both the peak intensity and the total energy of a pulse of radiant energy. Another object is the provision of a device for measuring both the peak intensity and total energy of a pulse of radiant energy wherein the measured values are stored until the values are recorded. Still another object is the provision of a device for measuring both the peak intensity and the total energy of a pulse of radiant energy wherein a relatively low speed inexpensive recorder is employed. Still a further object is the provision of a device for measuring both the peak intensity and the total energy of a pulse of radiant energy, which device is inexpensive and simple to operate.

Other objects and advantages of the present invention will become apparent by reference to the following description and accompanying drawing.

In the drawing:

FIGURE 1 is a schematic circuit diagram of a radiation measuring device in accordance with the present invention.

In accordance with the present invention, a measuring device is provided which generally includes means 10 for converting a pulse of radiant energy into direct current which is proportional to the intensity of the radiant energy. Means 12 are provided for determining the maximum amplitude of the current and storing the information, which information indicates the peak intensity of the pulse of radiant energy. Additional means 14 are provided for integrating the current, which integrated current indicates the total energy of the pulse of radiant energy. An indicating means 16 is selectively connected to the determining and storing means 12 and to the integrating means 14, thereby providing an indication of the peak intensity of the pulse of radiant energy and also the total energy in the pulse of radiant energy.

More specifically, the radiation measuring device may be employed to measure pulses of radiation, such as pulses of gamma rays, beta particles, etc. For purposes of explanation the device is described hereinafter in connection with the measuring of a pulse of neutrons.

In the device shown in the drawing, the converting means 10 includes a neutron detector 18 of the conventional ionization chamber type. Voltage is provided for the neutron detector 18 by a direct current power source 20 which is connected in series with the neutron detector 18. The collecting electrode of the neutron detector 18 is connected to a resistance 22 and a first capacitor 24 which are connected in series therewith.

When a pulse of neutrons strikes the detector 18, an ion current is generated which is proportional to the intensity of the neutron pulse. The ion current passes through the resistor 22 and charges the first capacitor 24 to a voltage which is proportional to the integrated ion current, and hence proportional to the integrated neutron pulse. The ion current flowing through the resistor 22 produces a voltage thereacross which is proportional to the instantaneous intensity of the neutron pulse. When the intensity of the neutron pulse is at its peak, the voltage appearing across the resistor 22 is at a maximum.

The maximum voltage appearing across the resistor 22 is determined and the information is stored by a circuit which includes a uni-directional circuit element 26, such as a diode, and a second capacitor 28 connected across the first capacitor 24 and the resistor 22. The uni-directional circuit element 26 is connected so that the second capacitor 28 is charged by the voltage appearing across the resistor 22 and the first capacitor 24. Since the second capacitor 28 is prevented from discharging back througs the resistor 22, the second capacitor 28 is charged to a voltage which is proportional to the maximum voltage appearing across the resistor 22 and the first capacitor 24.

The capacity of the second capacitor 28 is much less than the capacity of the first capacitor so that a minor portion of the ion current charges the second capacitor 28.

The voltage appearing across the first capacitor 24 and the voltage appearing across the second capacitor 28 are selectively measured by the indicating means 16 which, in the illustrated embodiment is a high impedance recorder. The recorder 16 is selectively connected through voltage dividers 30 and 32 to the capacitors 24 and 28, respectively.

The first voltage divider 30 includes a pair of series connected resistors 34 and 36 which shunt the first capacitor 24 and the second voltage divider 32 includes a pair of series connected resistors 38 and 40 which shunt the second capacitor 28. The resistances of the voltage dividers 30 and 32 are made large so that no appreciable change in potential takes place during the time required for recording the potential. In this connection, the RC time constants of the voltage divider 30 and capacitor 24 and the voltage divider 32 and capacitor 28 are made very long in comparison with the response time of the recorder 16.

The recorder 16 is selectively connected to the voltage dividers 30 and 32 by means of a double-throw relay 42, which includes a movable contact 44 and a pair of fixed contacts 46 and 48. The recorder 16 is connected to the movable contacts 44 and the voltage dividers 30 and 32 are respectively connected to the fixed contacts 46 and 48. The relay 42 may be energized automatically by a suitable timing means (not shown) or by a manually operated switch (not shown).

In operation the neutron detector 18 is arranged to receive the pulse of neutrons to be measured. The neutrons enter the neutron detector 18 and cause an ion current at the collecting electrode thereof. This current flows through the resistor 22 and through the first capacitor 24, thereby charging the first capacitor to a voltage proportional to the integral of the neutron pulse. The second capacitor 28 becomes charged to a voltage proportional to the maximum voltage drop across the resistor 22.

Thus, a voltage proportional to the peak intensity of the neutron pulse and a voltage proportional to the integral of the pulse intensity are respectively stored in the second and the first capacitors 28 and 24. The high impedance recorder 16 may then be employed to read out the information. This is accomplished by activating the recorder, whereby the recorder records the voltage appearing at the second voltage divider 32. The relay 42 is then activated whereby the recorder 16 records the voltage at the first voltage divider 30.

The above described device measures both the peak intensity and the total energy in a pulse of radiant energy. In the device, a relatively slow speed, inexpensive recorder may be employed to sequentially record the information.

Various changes and modifications may be made in the above described radiation measuring device without deviating from the spirit or scope of the present invention.

Various features of the invention are set forth in the accompanying claims.

What is claimed is:

1. A radiation measuring device comprising detecting means for converting a pulse of radiant energy into a direct current signal proportional to the intensity of the radiant energy, first circuit means continuously coupled to said detecting means for determining the maximum instantaneous current and storing the same, second circuit means continuously coupled to said detecting means for integrating the current, indicating means, and means for selectively coupling said indicating means to said first circuit means and to said second circuit means.

2. A radiation measuring device comprising means for converting a pulse of radiant energy into a direct current signal which is proportional to the intensity of radiant energy, a resistance and a capacitor connected in series with said converting means, a serially connected second capacitor and uni-directional circuit element coupled to said resistance so that the voltage across said second capacitor is proportional to the voltage drop across said resistance, means for indicating voltage, and means for selectively coupling said indicating means to said first and to said second capacitors.

3. A radiation measuring device comprising means for converting a pulse of radiant energy into a direct current signal which is proportional to the intensity of radiant energy, a resistance and a capacitor connected in series with said converting means, a serially connected second capacitor and uni-directional circuit element coupled to said resistance so that the voltage across said second capacitor is proportional to the voltage drop across said resistance, a recorder, and means for selectively coupling said recorder to said first and to said second capacitors, said first capacitor having a much greater capacity than said second capacitor.

4. A radiation measuring device comprising an ionization chamber, a source of direct current, a resistance, a first capacitor, said chamber, said source, said resistance, and said first capacitor being connected in series, a serially connected second capacitor and uni-directional circuit element coupled to said resistance so that the voltage across said second capacitor is proportional to the voltage drop across said resistance, means for indicating voltage, and means for selectively coupling said indicating means to said first and to said second capacitor.

5. A radiation measuring device comprising detecting means for converting a pulse of radiant energy into a direct current signal, the amplitude of which is proportional to the intensity of the radiant energy, a resistance and a first capacitor connected in series with said detecting means, a serially connected second capacitor and uni-directional circuit element coupled to said resistance so that the voltage across said second capacitor is proportional to the voltage drop across said resistance, a first voltage divider connected across said first capacitor, a second voltage divider connected across said second capacitor, a high impedance recorder, and means for selectively connecting said recorder to said first voltage divider and to said second voltage divider.

6. A radiation measuring device comprising detecting means for converting a pulse of radiant energy into a direct current signal, the amplitude of which is proportional to the intensity of the radiant energy being received, a serially connected resistance and first capacitor coupled to said detecting means, a serially connected second capacitor and uni-directional circuit element, shunting said resistance and said first capacitor, said first capacitor being much larger in capacity than said second capacitor, a first voltage divider connected across said first capacitor, a second voltage divider connected across said second capacitor, a high impedance recorder, and means for selectively connecting said recorder to said first voltage divider and to said second voltage divider, the time constant of said first capacitor and said first resistor and the time constant of said second capacitor and said second voltage divider being very long compared to the response time of said recorder.

References Cited in the file of this patent

UNITED STATES PATENTS

| | | |
|---|---|---|
| 2,584,844 | Constable | Feb. 5, 1952 |
| 2,884,533 | Richard-Foy | Apr. 28, 1959 |
| 2,920,208 | Crump | Jan. 5, 1960 |
| 2,974,231 | Greenblatt et al. | Mar. 7, 1961 |